US010608517B2

(12) United States Patent
Glöss

(10) Patent No.: US 10,608,517 B2
(45) Date of Patent: Mar. 31, 2020

(54) PLANAR POSITIONING APPARATUS AND POSITIONING TABLE

(71) Applicant: PHYSIK INSTRUMENTE (PI) GMBH & CO. KG, Karlsruhe (DE)

(72) Inventor: Rainer Glöss, Karlsruhe (DE)

(73) Assignee: PHYSIK INSTRUMENTE (PI) GMBH & CO. KG, Karlsruhe (DE)

(*) Notice: Subject to any disclaimer, the term of this patent is extended or adjusted under 35 U.S.C. 154(b) by 270 days.

(21) Appl. No.: 15/752,779

(22) PCT Filed: Aug. 22, 2016

(86) PCT No.: PCT/EP2016/069796
§ 371 (c)(1),
(2) Date: Feb. 14, 2018

(87) PCT Pub. No.: WO2017/032738
PCT Pub. Date: Mar. 2, 2017

(65) Prior Publication Data
US 2018/0241296 A1 Aug. 23, 2018

(30) Foreign Application Priority Data
Aug. 25, 2015 (DE) .................. 10 2015 216 199

(51) Int. Cl.
H02K 41/02 (2006.01)
H02K 41/03 (2006.01)
(Continued)

(52) U.S. Cl.
CPC ........... *H02K 41/031* (2013.01); *H02K 11/21* (2016.01); *H02K 11/30* (2016.01); *H02K 41/03* (2013.01); *B23Q 1/44* (2013.01); *H02K 2201/18* (2013.01)

(58) Field of Classification Search
CPC ............................... H01F 5/00; H01F 27/2847
See application file for complete search history.

(56) References Cited

U.S. PATENT DOCUMENTS 6,452,292 B1   9/2002   Binnard ................. 310/12.06
7,884,563 B2 * 2/2011   Takeuchi ............... H02P 6/28
                                                    310/156.35
(Continued)

FOREIGN PATENT DOCUMENTS

DE   102011100153 A1   10/2012   ............. H02K 41/03
WO   WO0010242 A1      2/2000    ............. B60L 13/10
(Continued)

OTHER PUBLICATIONS

The Notification Concerning Transmittal of International Preliminary Report on Patentability (Chapter I of the Patent Cooperation Treaty), in English, dated Mar. 8, 2018, which was issued by the International Bureau of WIPO in Applicant's corresponding international PCT application having Serial No. PCT/EP2016/069796, filed on Aug. 22, 2016.

(Continued)

*Primary Examiner* — Naishadh N Desai
(74) *Attorney, Agent, or Firm* — Bodner & O'Rourke, LLP; Gerald T. Bodner; Christian P. Bodner

(57) ABSTRACT

The invention relates to a planar positioning apparatus, comprising a stator which comprises a coil arrangement consisting of flat coils, a rotor which is arranged opposite the stator in the operating state of the positioning apparatus and which has a planar magnet arrangement comprising a plurality of rows of magnets, wherein the plane which is spanned by the planar magnet arrangement is arranged parallel to the plane of the coil arrangement, at least one position measuring head, which is arranged within the stator or rotor in the operating state of the positioning apparatus, for detecting the position of the rotor relative to the stator, an area scale which is fixed to the rotor or to the stator in a specific position, and an evaluation and control device for evaluating position signals of the position measuring head and for controlling the application of current to the coil (Continued)

Figure 1:
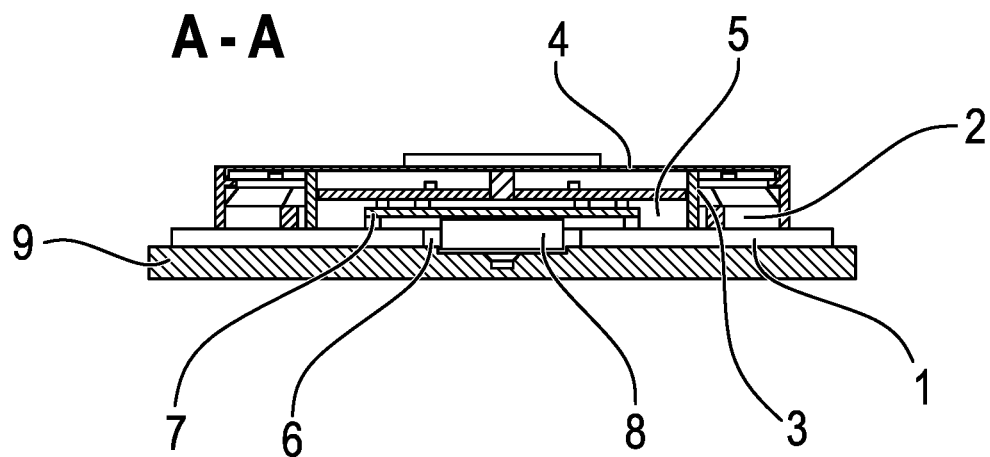

arrangement for controlling the position of the rotor with respect to the stator. The stator or the rotor has at least one window for making the area scale visible for the position measuring head, wherein the area scale extends beyond the window between the coil and magnet arrangement, is placed directly on at least one section of the magnet or the coil arrangement, consists of a material which does not influence the magnetic field between the stator and the rotor, and has associated holding means for ensuring a parallel configuration in relation to the rotor and stator over the entire extent of said area scale.

15 Claims, 4 Drawing Sheets

(51) Int. Cl.
    *H02K 11/21*     (2016.01)
    *H02K 11/30*     (2016.01)
    *B23Q 1/44*     (2006.01)

(56) References Cited

U.S. PATENT DOCUMENTS

| | | | |
|---|---|---|---|
| 9,479,040 B2 | 10/2016 | Schaffel et al. | |
| 2006/0049699 A1 | 3/2006 | Wang et al. | 310/12.18 |
| 2007/0035267 A1* | 2/2007 | Gao | G03F 7/70716 318/649 |
| 2012/0319531 A1* | 12/2012 | Koc | H01L 41/0986 310/328 |
| 2013/0257575 A1* | 10/2013 | Timashov | H01F 27/2847 336/200 |

FOREIGN PATENT DOCUMENTS

| | | | |
|---|---|---|---|
| WO | WO2009115071 A2 | 9/2009 | H02K 21/26 |
| WO | WO2013059934 A1 | 5/2013 | H01L 21/67 |

OTHER PUBLICATIONS

The English translation of the International Preliminary Report on Patentability (Chapter I of the Patent Cooperation Treaty), dated Feb. 27, 2018, which was issued by the International Bureau of WIPO in Applicant's corresponding international PCT application having Serial No. PCT/EP2016/069796, filed on Aug. 22, 2016.

The Written Opinion of the International Searching Authority, in English, dated Nov. 9, 2016, which was issued by the International Bureau of WIPO in Applicant's corresponding international PCT application having Serial No. PCT/EP2016/069796, filed on Aug. 22, 2016.

The International Search Report, in English, dated Nov. 9, 2016, which was issued by the International Bureau of WIPO in Applicant's corresponding international PCT application having Serial No. PCT/EP2016/069796, filed on Aug. 22, 2016.

* cited by examiner

PLANAR POSITIONING APPARATUS AND POSITIONING TABLE

The invention relates to a planar positioning apparatus, comprising a stator which comprises a coil arrangement consisting of flat coils, a rotor which is arranged opposite the stator in the operating state of the positioning apparatus and which has a planar magnet arrangement comprising a plurality of rows of magnets, wherein the plane which is spanned by the planar magnet arrangement is arranged parallel to the plane of the coil arrangement, at least one position measuring head, which is arranged within the stator or rotor in the operating state of the positioning apparatus, for detecting the position of the rotor relative to the stator, an area scale which is fixed to the rotor or the stator in a specific position, and an evaluation and control device for evaluating position signals of the position measuring head and for controlling the application of current to the coil arrangement for controlling the position of the rotor with respect to the stator, wherein the stator or the rotor has at least one window for making the area scale visible for the position measuring head. It moreover relates to a positioning table including such a positioning apparatus, as well as a machining or measuring arrangement equipped with such a positioning apparatus.

Numerous types of machine tools or other machining or measurement arrangements are equipped with positioning tables, also referred to as cross table or XY table, for adequately positioning a workpiece with respect to a tool or else a measurement object with respect to a measuring device. Advanced positioning tables of this kind do not only offer a pure XY positioning but also multi-axis positioning and are also referred to in their highest stage of development as 6D positioners or tables.

While traditional XY or cross tables are equipped with two linear actuators, drive concepts gain practical importance for some time which are based on flat coil arrangements or planar arrays of permanent magnets on the stator and/or rotor side. So-called "planar motors" or planar drives only comprise a single motor primary part (stator) and a motor secondary part (rotor) equipped with permanent magnets so that a second drive motor is omitted just as are additional mechanical transmission elements which are required, for instance, in ball screw drives.

Planar positioning apparatuses of the mentioned or similar kind are known from U.S. Pat. No. 6,452,292 B1, US 2007/0035267 A1, US 2006/0049699 A1, WO 2009/115071 A2 and WO 2013/0059934 A1, for example.

Figure 2:
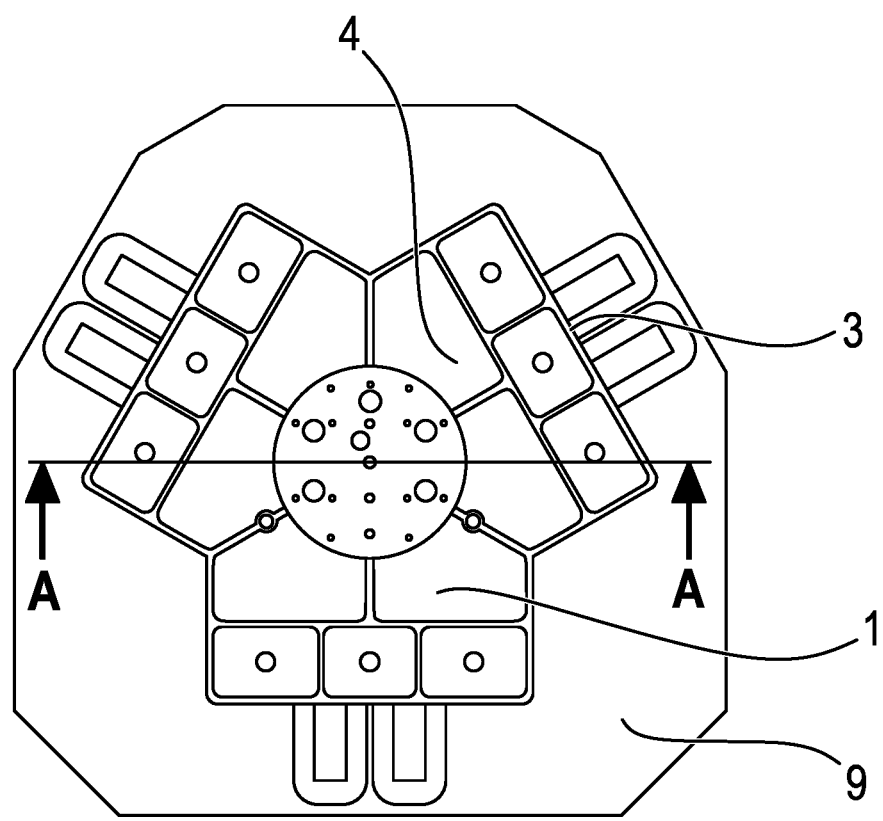

Also, document DE 10 2011 100 153 A1 originating from the Applicant, discloses a generic planar positioning apparatus. The structure of this planar positioning apparatus is schematically shown in FIGS. 1 and 2. A planar coil array 1 made of six flat coils here, which are arranged in three pairs in a star shape each offset by 120°, is arranged on and attached to a stator plate 9. In the center of the coil array, a free space or window 6 is left, in which a position measuring head (6D measuring head) 8 is mounted to the stator plate. Above the stator plate 9 comprising the coil array 1, a rotor 3 is arranged, that is movable relative to same and comprises a planar magnet array 2 formed of three rows of mutually polarized magnets each positioned to be centric to a coil pair of the coil array 1 when the rotor 3 is in the central position. In the center of the magnet array as well, a free space or window 5 is situated offering space for an area scale 7 which, in cooperation with the position measuring head 8, serves to measure the position of the rotor 3 relative to the stator 9. On the upper side of the rotor 2, an object carrier or workpiece carrier 4 is arranged.

Due to the conception of the position sensor system, the lateral range of displacement is relatively restricted in known planar positioning apparatuses.

The invention is therefore based on the task of providing a planar positioning apparatus with improved functional characteristics, according to an aspect of the invention specifically with an enlarged range of displacement and higher actuating power in the Z direction while exhibiting a position setting precision meeting the requirements.

The task is solved according to a first aspect of the invention by a planar positioning apparatus according to the features of claim 1. According to a relatively independent aspect of the invention, a planar positioning apparatus having the features of claim 9 is moreover provided. Appropriate further developments of the inventive idea are the subject matter of the respective dependent claims. Moreover, an advantageous positioning table is proposed.

The first aspect of the invention includes the idea to provide an area scale which extends beyond the window in the stator (or rotor) between the coil and magnet arrangement and offers an enlarged position detection range for the position measuring head. A further idea of the invention is that the area scale is placed directly on at least one section of the magnet arrangement—or alternatively, the coil arrangement. According to a further idea of the invention, this area scale is formed of a material which does not influence the magnetic field between the stator and the rotor (to be more precise: between the flat coils and the permanent magnets). According to a further constituent idea of this aspect of the invention, this enlarged area scale has associated holding means for ensuring a parallel configuration in relation to the rotor and stator over the entire extent of said area scale without any relevant bending, bulging or waviness.

According to a realization of this aspect, the area scale extends at least over the major part of the rotor or stator surface. Even more specifically, the area scale extends over a plurality of windows or observation openings in the rotor or stator. In any case with respect to the position sensor system, this establishes a displacement range of the positioning apparatus which substantially corresponds to the dimensions of the drive component stator or rotor.

In a further realization, the area scale is manufactured from a material and having a thickness which ensure high inherent rigidity. Basically, apart from glass or ceramics, metals are also applicable which are not magnetic and not magnetizable and do not disturb the magnetic field between stator and rotor. In a configuration of this aspect, the area scale is manufactured from glass, in particular tempered glass or an aluminum alloy of high hardness.

A further configuration provides for the area scale to have a thickness of between 0.3 and 3 mm. The thickness to be selected specifically, of course, will depend on the dimensions of the positioning apparatus as a whole and the material used for the area scale, as well as the existing precision requirements.

In a further realization of the invention, the area scale is mounted to the rotor such as to be supported at webs provided on the rotor between rows of magnets. Analogously, a support of the area scale may take place at corresponding webs or supporting points on the stator if the area scale is provided to be attached to the stator. Thereby, bulgings or undulations may be avoided to the greatest possible extent at least in the direction toward the respective supporting points or lines on the rotor or stator. An in particular predefined elastic bonding to the webs or supporting points even improves this effect.

According to a further realization, the holding means comprise a clamping device for tangentially clamping the area scale in both extension directions of the rotor or stator. Such clamping devices are basically known; for example, clamping or gripping jaws that are displaceable in the X and Y directions may realize this function.

According to the second aspect, the invention is based on a rotor configuration having a chessboard-like arrangement of rows of magnets, in which in each case a separating web is formed between adjacent rows of magnets. At this, it is proposed for the rows of magnets and webs to be configured such that the boundary edges, that are usually located obliquely opposite one another, of diagonally opposite rows of magnets are aligned with one another. Hereby, the configuration of the magnetic field established between stator and rotor may be optimized.

It is in particular provided for consecutive boundary webs extending in the same direction to have a lateral offset by approximately the amount of the web width.

The webs may be manufactured in one piece with the base body of the rotor or positioning table, for example, by leaving them when recesses for the magnet arrangement are milled out.

In a configuration known as such, which enables rotational movements of a work piece or measurement object to be realized in an advantageous manner, the rotor comprises four square rows of magnets in a chessboard arrangement, and in this case the aligned boundary edges of the magnet field rows located diagonally opposite intersect at a central point of intersection.

In a further realization it is provided for the rows of magnets to substantially cover the central area of the rotor. However, this is not a feature that is necessary for the invention, rather the aligned arrangement of the boundary edges may be also advantageous in a configuration of the rotor, in which the rotor has an observation window for the position sensor system in the central area.

Advantages and expedient characteristics of the invention incidentally arise from the following sketch-like description of exemplary embodiments by means of the Figures. Shown are in:

FIGS. 1 and 2 a schematic sectional view and a top view of a known planar positioning apparatus, respectively.

FIGS. 3A to 3D a perspective sectional view, a perspective total view, a perspective sectional view and an exploded representation of essential part of planar positioning apparatuses according to embodiments of the invention.

Figure 3A:
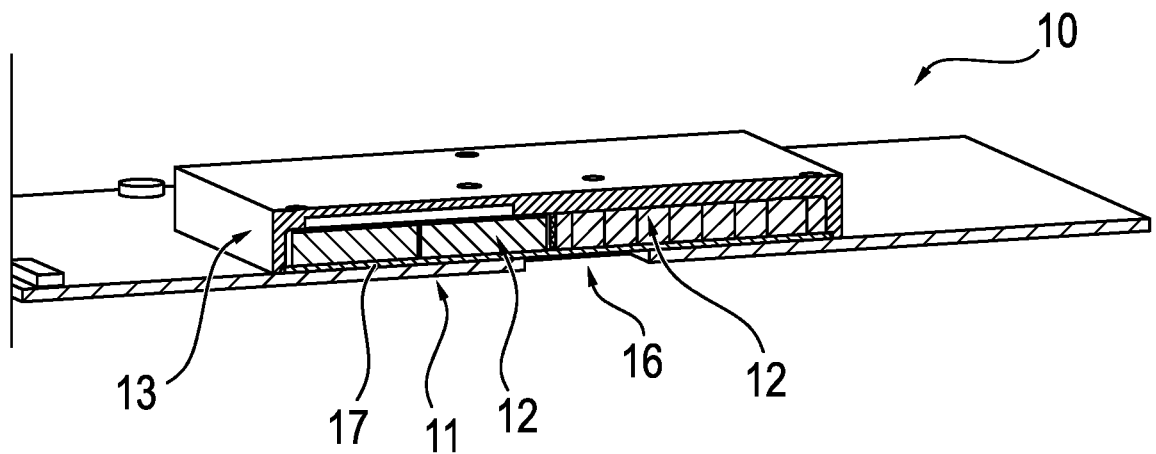
Figure 3B:
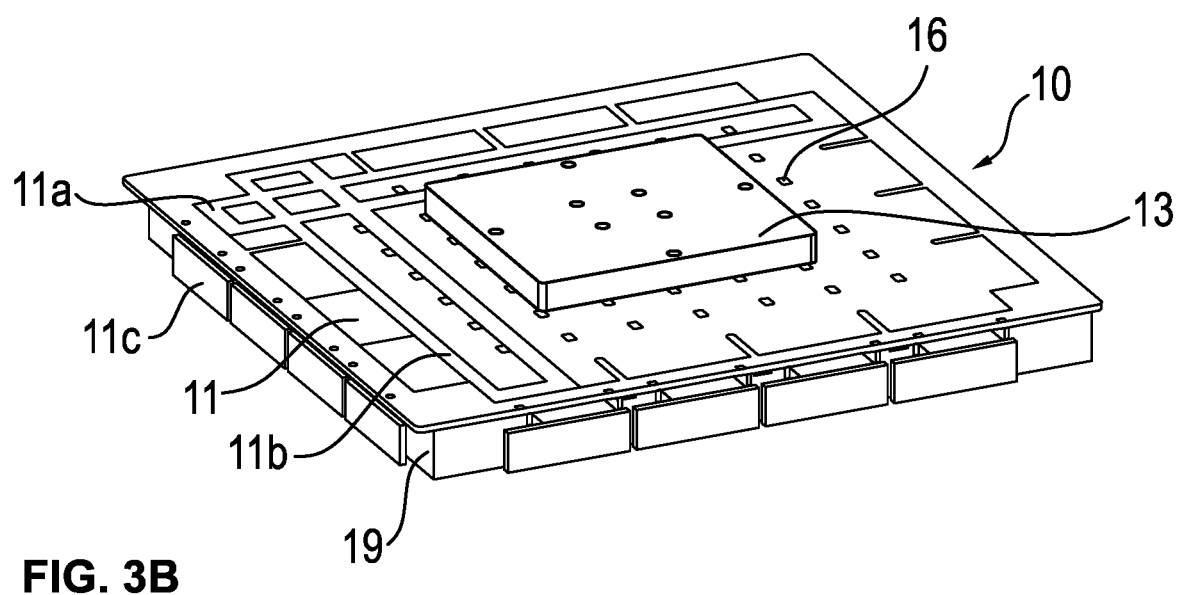
Figure 3C:
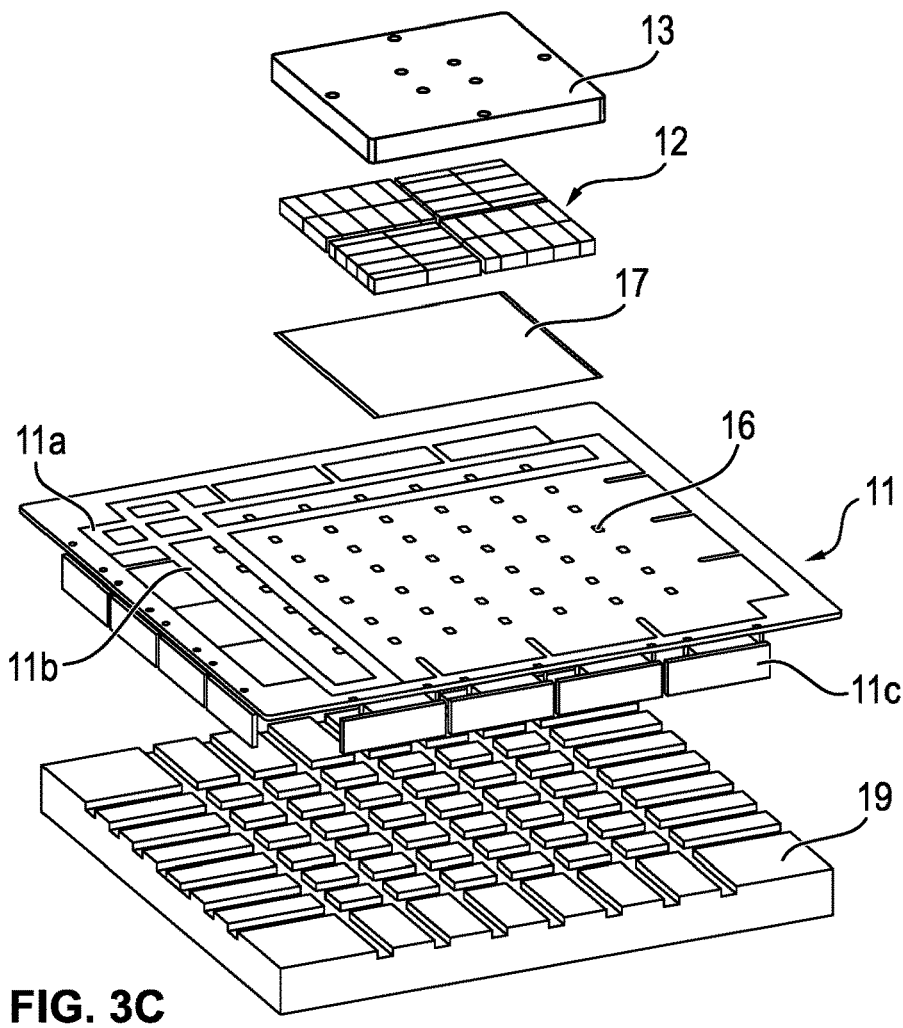
Figure 3D:
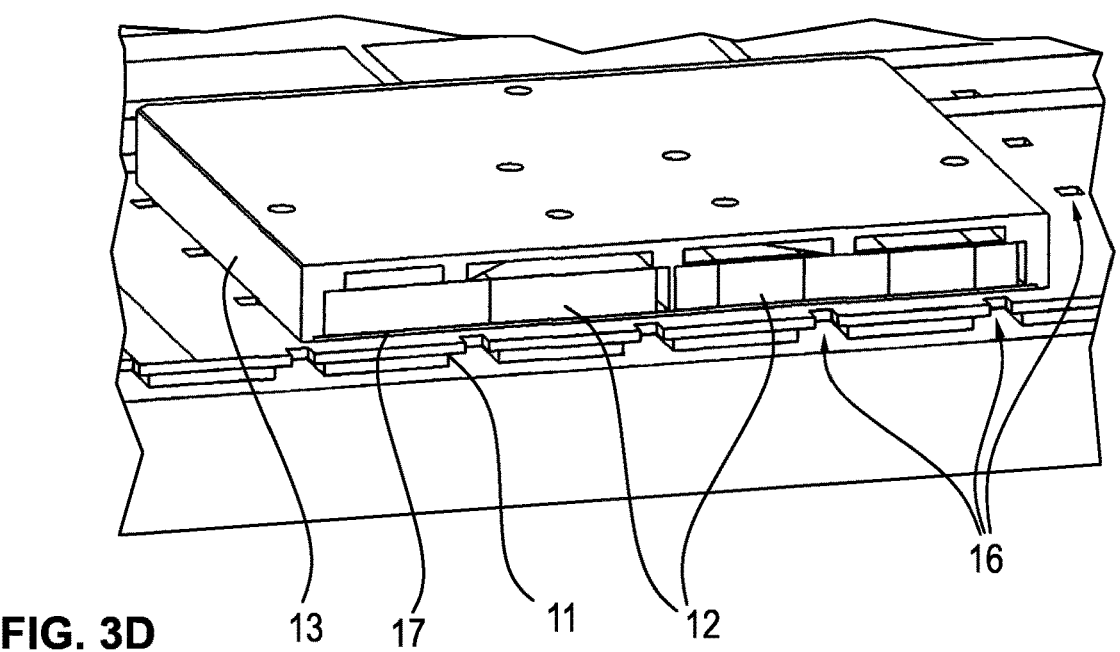
Figure 4:
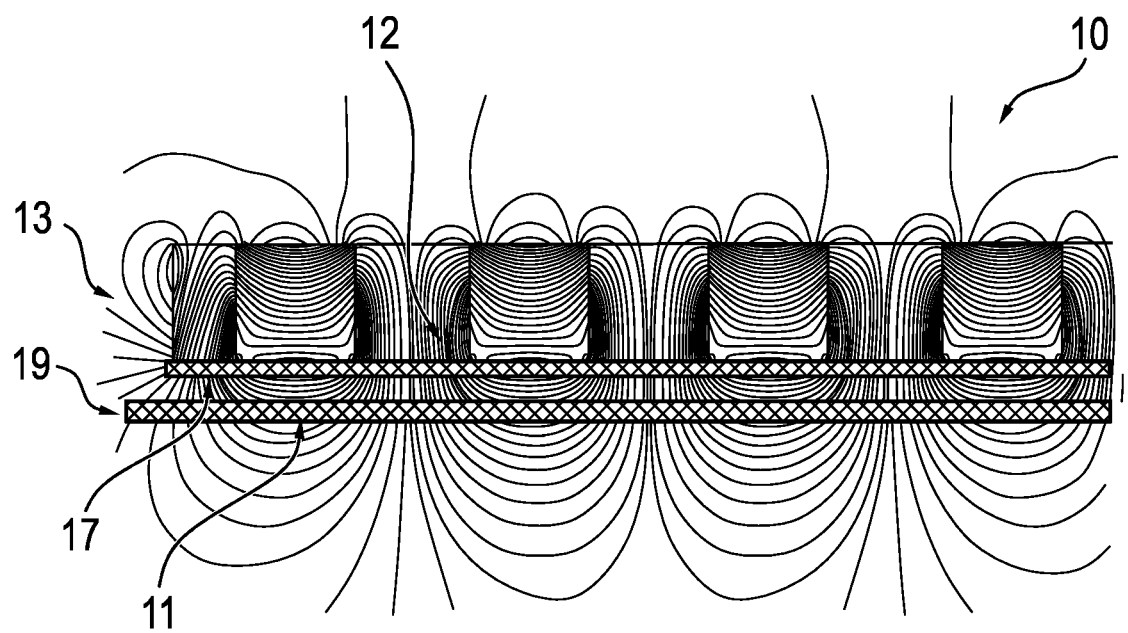
Figure 5:
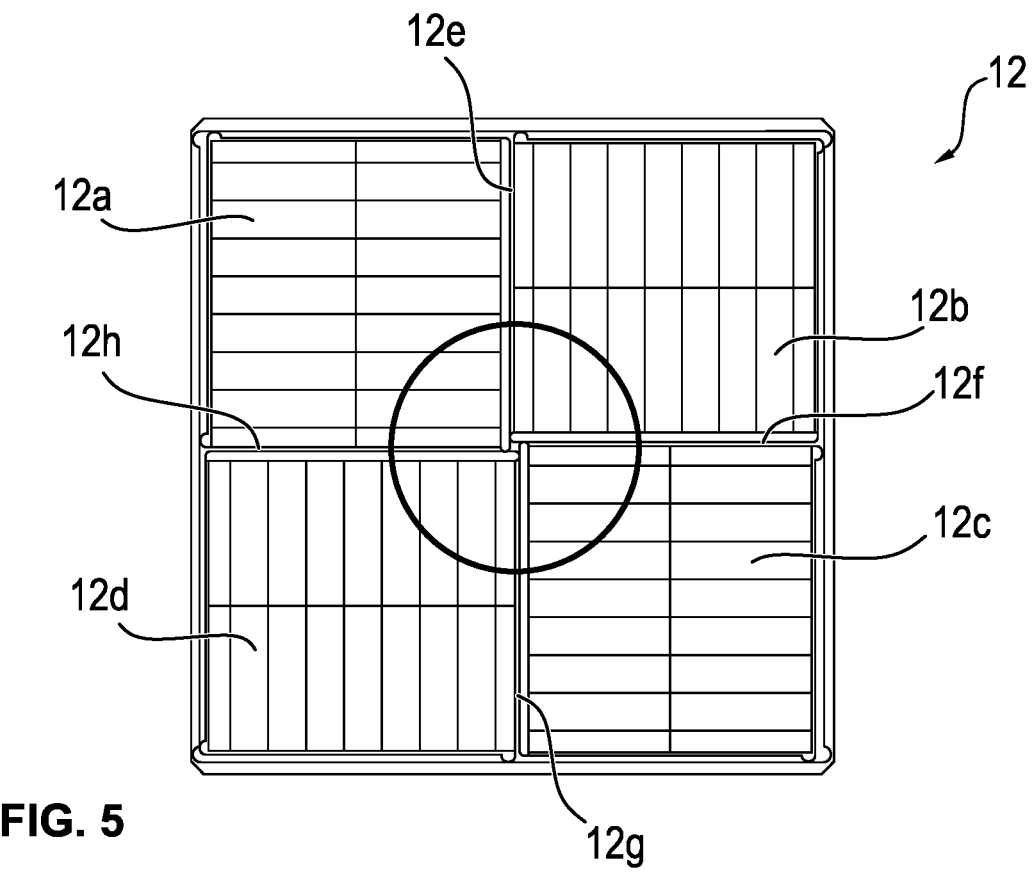

FIG. 4 a partial sectional view of the planar positioning apparatus according to FIG. 3A with representation of the magnetic field lines, and FIG. 5 a top view of a planar magnet arrangement according to an embodiment of the invention which may be employed in the planar positioning apparatuses according to FIGS. 3A to 3D and 4.

In the embodiment of a planar positioning apparatus 10 according to the invention that is shown in FIGS. 3A to 3D and 4, the apparatus has a stator (base body) 19 of a flat design including a coil arrangement 11, above which a rotor/positioning table 13 of a hood-like configuration and including an integrated planar magnet arrangement (Halbach arrays) 12 is arranged. The coil arrangement 11 comprises a three-phase system from which in each case only one coil 11a in the X direction and only one coil 11b in the Y direction are illustrated for reasons of clarity, and a coil driver board 11c. While in a first configuration (FIG. 3A), in the stator 19 having the coil arrangement 11 just as in the known arrangement described further above, a central free space or a window 16 for a position measuring head (not shown here) is provided, and a second configuration (FIGS. 3A to 3D) comprises a regular arrangement of a plurality of windows or observation openings 16 there is no such free space or window in the magnet arrangement 12 in the rotor/positioning table 13. The rows of magnets extend as far as into the center of the rotor without any gaps.

Onto the bottom side of the planar magnet arrangement 12 in the rotor/positioning table 13, an area scale 17 of glass is fixedly placed extending over the entire extension of the rotor. Preferably, the area scale 17 is clamped in the XY plane by a clamping device not shown in the Figure and/or elastically adhered to the rotor at the outer edges of the rotor/positioning table 13. As becomes apparent from the partial view according to FIG. 4, the course of the magnetic field lines between the coil arrangement 11 and magnet arrangement 12 is not disturbed by the interposed area scale 17. Apart from glass, this effect may also be achieved with other non-metallic materials or else with not magnetic and not magnetizable materials, for example, ceramics or aluminum alloys, which are also candidates for implementing the area scale due to their mechanical properties and moderate costs.

FIG. 5 shows a realization of the magnet arrangement 12 with four rows of magnets 12a-12d that are square in their outer contour and between which separating webs 12e-12h are provided. As mentioned further above, the rows of magnets extend in this realization of the planar positioning apparatus as far as to the center thereof.

In order to achieve a mutually aligned orientation of the boundary edges, that are usually located obliquely opposite one another, of diagonally opposite rows of magnets 12a and 12c and 12b and 12d, respectively, the boundary webs 12e and 12g and 12f and 12h, respectively, are not aligned to one another but arranged at an offset against one another which corresponds approximately to the web width. The mutually aligned arrangement of the relevant boundary edges of the rows of magnets located diagonally opposite allows the optimization of the magnetic field configuration between the planar magnet arrangement in the rotor and the planar coil arrangement in the stator of the positioning apparatus to be achieved. The coil wires that are located to be linear in the circuit board for generating forces thus cover the diagonally generated and adjacent magnetic fields without any gaps and have no phase offset between them.

Incidentally, the webs 12e-12h may be dimensioned in their heights such as to serve at the same time as support lines for the area scale mounted below the magnet arrangement according to FIGS. 3 and 4 and support the same such that a bulging in the direction toward the magnet arrangement or an undulation, which could distort the position measurements, is avoided to the greatest possible extent. In a particularly advantageous manner, this effect may be realized in cooperation with a clamping device and other holding means at the outer edges of the rotor.

The realization of the invention is not restricted to these examples but likewise possible in a variety of modifications which are in the scope of skilled action.

The invention claimed is:

1. Planar positioning apparatus, comprising
a stator which comprises a coil arrangement consisting of flat coils, a rotor which is arranged opposite the stator in the operating state of the positioning apparatus and which has a planar magnet arrangement comprising a plurality of rows of magnets, wherein the plane which is spanned by the planar magnet arrangement is arranged parallel to the plane of the coil arrangement, a position measuring head, which is arranged within the stator or rotor in the operating state of the positioning apparatus, for detecting the position of the rotor relative to the stator, an area scale which is fixed to the rotor or the stator in a specific position, and an evaluation and control device for evaluating position signals of the position measuring head and for controlling the application of current to the coil arrangement for controlling the position of the rotor with respect to the stator, wherein the stator or the rotor has at least one window for making the area scale visible for the position measuring head, and the area scale extends beyond the window between the coil and magnet arrangement, wherein the rotor comprises a chessboard-like arrangement of fields of rows of magnets each having a square contour and a uniform polarization of all of the magnets in one field and mutually perpendicular polarization of the adjacent fields, and in each case a separating web is formed between adjacent fields, wherein the fields and the webs are configured such that two boundary edges, that are located obliquely opposite one another, of diagonally opposite rows of magnets are aligned with one another, and wherein consecutive boundary webs extending in the same direction each have a lateral offset by the amount of the web width.

2. Planar positioning apparatus according to claim 1, wherein the rotor has four square rows of magnets in a chessboard arrangement, and the aligned boundary edges intersect at a central point of intersection.

3. Planar positioning apparatus according to claim 1, wherein the rows of magnets substantially cover the central area of the rotor.

4. Planar positioning apparatus according to claim 1, wherein each row of magnets forms a Halbach array.

5. Planar positioning apparatus according to claim 1, wherein the area scale is placed directly on at least one section of the magnet arrangement or coil arrangement, is formed of a material which does not influence the magnetic field between the stator and the rotor, and has associated holding means for ensuring a parallel configuration over its entire extension in relation to the rotor and stator.

6. Planar positioning apparatus according to claim 5, wherein the area scale extends at least over the major part of the rotor or stator surface and/or over a plurality of windows in the rotor or stator.

7. Planar positioning apparatus according to claim 5, wherein the area scale is manufactured from a material and having a thickness which ensure high inherent rigidity.

8. Planar positioning apparatus according to claim 5, wherein the area scale is manufactured from glass, in particular tempered glass or an aluminum alloy of high hardness.

9. Planar positioning apparatus according to claim 5, wherein the area scale has a thickness of between 0.5 and 3 mm.

10. Planar positioning apparatus according to claim 5, wherein the area scale is mounted to the rotor such as to be supported at webs provided on the rotor between rows of magnets.

11. Planar positioning apparatus according to claim 5, wherein the holding means comprise a clamping device for tangentially clamping the area scale in both extension directions of the rotor or stator.

12. Planar positioning apparatus according to claim 5, wherein the holding means comprise an adhesive bonding between the area scale and that of the rotor or stator, upon which it is placed, in particular to webs and/or supporting points provided on the rotor.

13. Positioning table having a planar positioning apparatus according to claim 1, holding and guiding means for the planar positioning apparatus, and an object holder for holding an object to be positioned.

14. Processing arrangement, in particular machine tool, having a positioning table according to claim 13.

15. Measuring arrangement having a positioning table according to claim 13.

* * * * *